United States Patent
Deng

(10) Patent No.: US 11,891,082 B2
(45) Date of Patent: Feb. 6, 2024

(54) BLIND SPOT WARNING SYSTEM OF A MOTOR VEHICLE

(71) Applicant: GM Global Technology Operations LLC, Detroit, MI (US)

(72) Inventor: Zhiqiang Deng, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 215 days.

(21) Appl. No.: 17/490,126

(22) Filed: Sep. 30, 2021

(65) Prior Publication Data
US 2023/0087743 A1    Mar. 23, 2023

(30) Foreign Application Priority Data

Sep. 23, 2021  (CN) .......................... 202111115324.6

(51) Int. Cl.
*B60W 50/14*    (2020.01)
*B62D 15/02*    (2006.01)

(52) U.S. Cl.
CPC .......... *B60W 50/14* (2013.01); *B62D 15/021* (2013.01); *B60W 2050/143* (2013.01); *B60W 2420/52* (2013.01); *B60W 2554/4048* (2020.02)

(58) Field of Classification Search
CPC ......... B60W 50/14; B60W 2554/4048; B60W 2050/143; B60W 2420/52; B62D 15/021
See application file for complete search history.

(56) References Cited

U.S. PATENT DOCUMENTS

| | | | |
|---|---|---|---|
| 2008/0291000 A1* | 11/2008 | Kim ...................... | G01S 7/4813 340/436 |
| 2016/0288713 A1* | 10/2016 | Hoyda ................... | B60K 35/00 |
| 2020/0377004 A1 | 12/2020 | Zhang et al. | |

* cited by examiner

*Primary Examiner* — Faris S Almatrahi
*Assistant Examiner* — Andrew J Cromer
(74) *Attorney, Agent, or Firm* — Vivacqua Crane PLLC

(57) ABSTRACT

A blind spot warning system is provided for a motor vehicle having a longitudinal axis and a steering shaft. The system includes a steering angle sensor (SAS), which is coupled to the steering shaft and generates a steering signal associated with a wheel angle in response to the steering shaft rotating. The system further includes a computer having one or more processors and a non-transitory computer readable storage medium storing instructions. The processor is programmed to determine a blind spot region extending from a sideview mirror of the motor vehicle and based on the wheel angle. The processor is further programmed to generate an actuation signal associated with the blind spot region. The system further includes one or more light projectors that project a light onto a roadway adjacent to the motor vehicle to indicate a current size and a current location of the blind spot region.

19 Claims, 3 Drawing Sheets

BLIND SPOT WARNING SYSTEM OF A MOTOR VEHICLE

INTRODUCTION

The present disclosure relates to blind spot warning systems of motor vehicles, and more particularly to a blind spot warning system that alerts pedestrians, bicyclists, and operators of other motor vehicles of a current location and a current size of a blind spot when a motor vehicle is turning.

Modern vehicles can include blind spot monitoring systems with sensors mounted to external structures on both sides of the vehicle. Each sensor is directed to a single fixed area, e.g., a static blind spot that is not visible through the rear view mirror or the sideview mirrors, and detects whether a third party vehicle is located in the static blind spot. These systems can further include one or more notification devices that alert the driver when third party vehicles are located in the static blind spot. The notification devices can provide a visual warning, an audible warning, or a tactile warning perceived by the driver. While these systems alert the driver of the host vehicle that there is a third party vehicle in the static blind spot, the systems do not determine a dynamic blind spot, which can increase or decrease depending on the wheel angle and is not visible when the driver's attention is focused on turning the vehicle. In addition, while existing systems alert the driver of the host vehicle that a third party vehicle is currently positioned within the blind spot, these systems do not alert third parties, e.g., pedestrians, bicyclists, or drivers of third party vehicles, that those third parties are approaching or currently located within the blind spot. In fact, current systems do not even determine whether pedestrians and bicyclists are located in the static blind spot of the host vehicle. Because the sensors are mounted to external structures of the vehicle and are directed outboard, the sensors can be covered by dirt, ice, and snow, which may in turn reduce functionality and prevent the systems from detecting vehicles.

Thus, while current blind spot monitoring systems achieve their intended purpose, there is a need for a new and improved blind spot warning system that addresses these issues.

SUMMARY

According to several aspects, a blind spot warning system is provided for a motor vehicle, which has a longitudinal axis and a steering shaft that turns the motor vehicle relative to the longitudinal axis. The system includes a steering angle sensor (SAS) coupled to the steering shaft for generating a steering signal associated with a wheel angle, in response to the steering shaft rotating. The system further includes a computer having one or more processors and a non-transitory computer readable storage medium storing instructions. The processor is programmed to determine a blind spot region extending from a sideview mirror of the motor vehicle, in response to the processor receiving the steering signal from the SAS. The blind spot region is spaced from a line of sight of a driver and has a current size and a current location that are based on the wheel angle. The blind spot region has a forward boundary that is angularly spaced from the longitudinal axis by a first angle and a rear boundary that is angularly spaced from the forward boundary by a second angle. The processor is further programmed to generate an actuation signal associated with the blind spot region. The system further includes one or more light projectors, which are coupled to the processor and project a light onto a roadway adjacent to the motor vehicle, in response to the light projector receiving the actuation signal from the processor. The light indicates the current location and the current size of the blind spot region relative to the motor vehicle.

In one aspect, the light projector is configured to project the light onto a portion of the roadway, such that the light has a leading edge that is disposed at the first angle relative to the longitudinal axis and overlaps the forward boundary of the blind spot region, in response the light projector receiving the actuation signal from the processor.

In another aspect, the light projector is configured to project the light onto the portion of the roadway, such that the light has a trailing edge that is disposed at the second angle relative to the leading edge of the light and overlaps the rear boundary of the blind spot region, in response the light projector receiving the actuation signal from the processor.

In another aspect, the processor is further programmed to determine that the first angle is 90 degrees and the second angle is 60 degrees, in response to the processor determining that the wheel angle is 3 degrees.

In another aspect, the processor is further programmed to determine that the first angle is 80 degrees and the second angle is 75 degrees, in response to the processor determining that the wheel angle is 4.5 degrees.

In another aspect, the processor is further programmed to determine that the first angle is 70 degrees and the second angle is 85 degrees, in response to the processor determining that the wheel angle is 9 degrees.

In another aspect, the processor is further programmed to determine that the first angle is 70 degrees and the second angle is 85 degrees, in response to the processor determining that the wheel angle is 13.5 degrees.

In another aspect, the processor is further programmed to determine that the first angle is 80 degrees and the second angle is 75 degrees, in response to the processor determining that the wheel angle is 18 degrees.

In another aspect, the processor is further programmed to determine that the first angle is 90 degrees and the second angle is 60 degrees, in response to the processor determining that the wheel angle is 22.5 degrees.

In another aspect, the system further includes an acoustic device coupled to the processor and configured to generate at least one of a sound and a message, in response to the acoustic device receiving the actuation signal from the processor.

According to several aspects, a computer is provided for a blind spot warning system of a motor vehicle. The motor vehicle includes a longitudinal axis and a steering shaft that turns the motor vehicle relative to the longitudinal axis. The motor vehicle further includes a steering angle sensor (SAS) coupled to the steering shaft for generating a steering signal associated with a wheel angle, in response to the steering shaft rotating. The system further includes one or more light projectors and a computer, which has one or more processors adapted to electrically connect to the SAS and the light projector. The computer further includes a non-transitory computer readable storage medium (CRM) storing instructions. The processor is programmed to determine a blind spot region extending from a sideview mirror of the motor vehicle, in response to the processor receiving the steering signal from the SAS. The blind spot region is spaced from a line of sight of a driver and has a current size and a current location that are based on the wheel angle. The blind spot region includes a forward boundary that is angularly spaced from the longitudinal axis by a first angle and a rear boundary that is angularly spaced from the forward boundary by a second angle. The processor is further programmed to generate an actuation signal associated with the blind spot region, with the actuation signal being received by the light projector for projecting a light onto a roadway to indicate the current size and the current location of the blind spot region.

In one aspect, the processor is further programmed to determine that the first angle is 90 degrees and the second angle is 60 degrees, in response to the processor determining that the wheel angle is 3 degrees.

In another aspect, the processor is further programmed to determine that the first angle is 80 degrees and the second angle is 75 degrees, in response to the processor determining that the wheel angle is 4.5 degrees.

In another aspect, the processor is further programmed to determine that the first angle is 70 degrees and the second angle is 85 degrees, in response to the processor determining that the wheel angle is 9 degrees.

In another aspect, the processor is further programmed to determine that the first angle is 70 degrees and the second angle is 85 degrees, in response to the processor determining that the wheel angle is 13.5 degrees.

In another aspect, the processor is further programmed to determine that the first angle is 80 degrees and the second angle is 75 degrees, in response to the processor determining that the wheel angle is 18 degrees.

In another aspect, the processor is further programmed to determine that the first angle is 90 degrees and the second angle is 60 degrees, in response to the processor determining that the wheel angle is 22.5 degrees.

According to several aspects, a process is provided for operating a blind spot warning system of a motor vehicle. The motor vehicle has a longitudinal axis and a steering shaft that turns the motor vehicle relative to the longitudinal axis. The system vehicle includes a steering angle sensor (SAS), which is coupled to the steering shaft. The SAS generates a steering signal associated with a wheel angle, in response to the steering shaft rotating. The system further includes one or more light projectors and a computer, which has one or more processors and a non-transitory computer readable storage medium storing instructions. The process includes rotating, using a steering wheel attached to the steering shaft, the steering shaft. The process further includes generating, using the SAS, a steering signal in response to the steering shaft being rotated. The process further includes determining, using the processor, a blind spot region extending from a sideview mirror of the motor vehicle, in response to the processor receiving the steering signal from the SAS. The blind spot region is spaced from a line of sight of a driver and has a current size and a current location that are based on the wheel angle. The blind spot region includes a forward boundary that is angularly spaced from the longitudinal axis by a first angle and a rear boundary that is angularly spaced from the forward boundary by a second angle. The process further includes generating, using the processor, an actuation signal associated with the blind spot region. The process further includes projecting, using the light projector, a light onto a roadway adjacent to the motor vehicle to indicate a current size and a current location of the blind spot region, in response to the light projector receiving the actuation signal from the processor.

In one aspect, the process further includes projecting, using the light projector, the light onto a portion of the roadway such that the light has a leading edge that is disposed at the first angle relative to the longitudinal axis and overlaps the forward boundary of the blind spot region, in response the light projector receiving the actuation signal from the at least one processor.

In another aspect, the process further includes projecting, using the light projector, the light onto the portion of the roadway such that the light has a trailing edge that is disposed at the second angle relative to the leading edge of the light and overlaps the rear boundary of the blind spot region in response the light projector receiving the actuation signal from the at least one processor.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
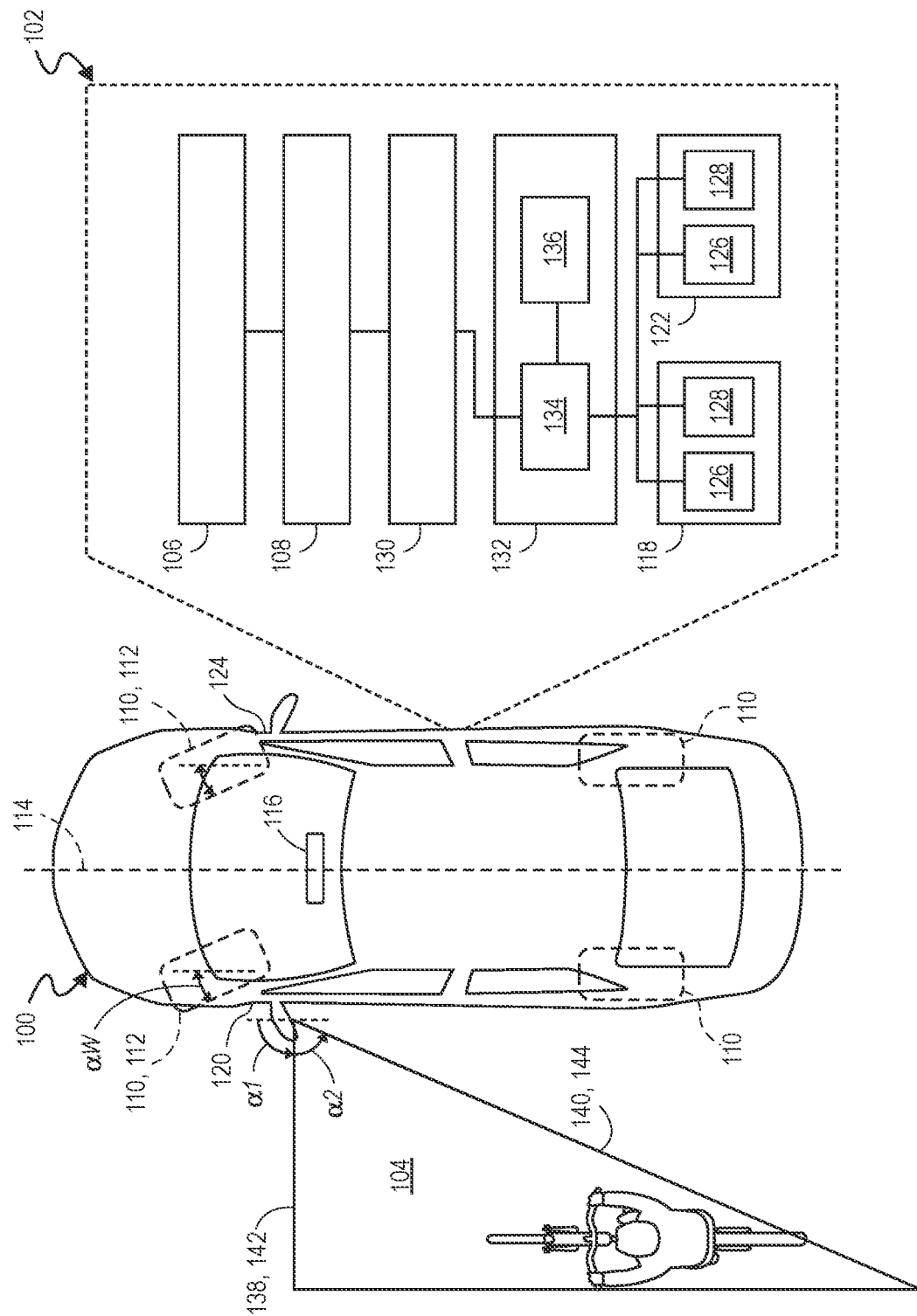
FIG. 1 is a schematic view of one example of a motor vehicle having a blind spot warning system, illustrating the vehicle making a left turn and the system projecting a light onto a portion of roadway that is located to the left of the vehicle, with the light indicating a current size and a currently location of a blind spot region being associated with a wheel angle for the left turn.
Figure 2:
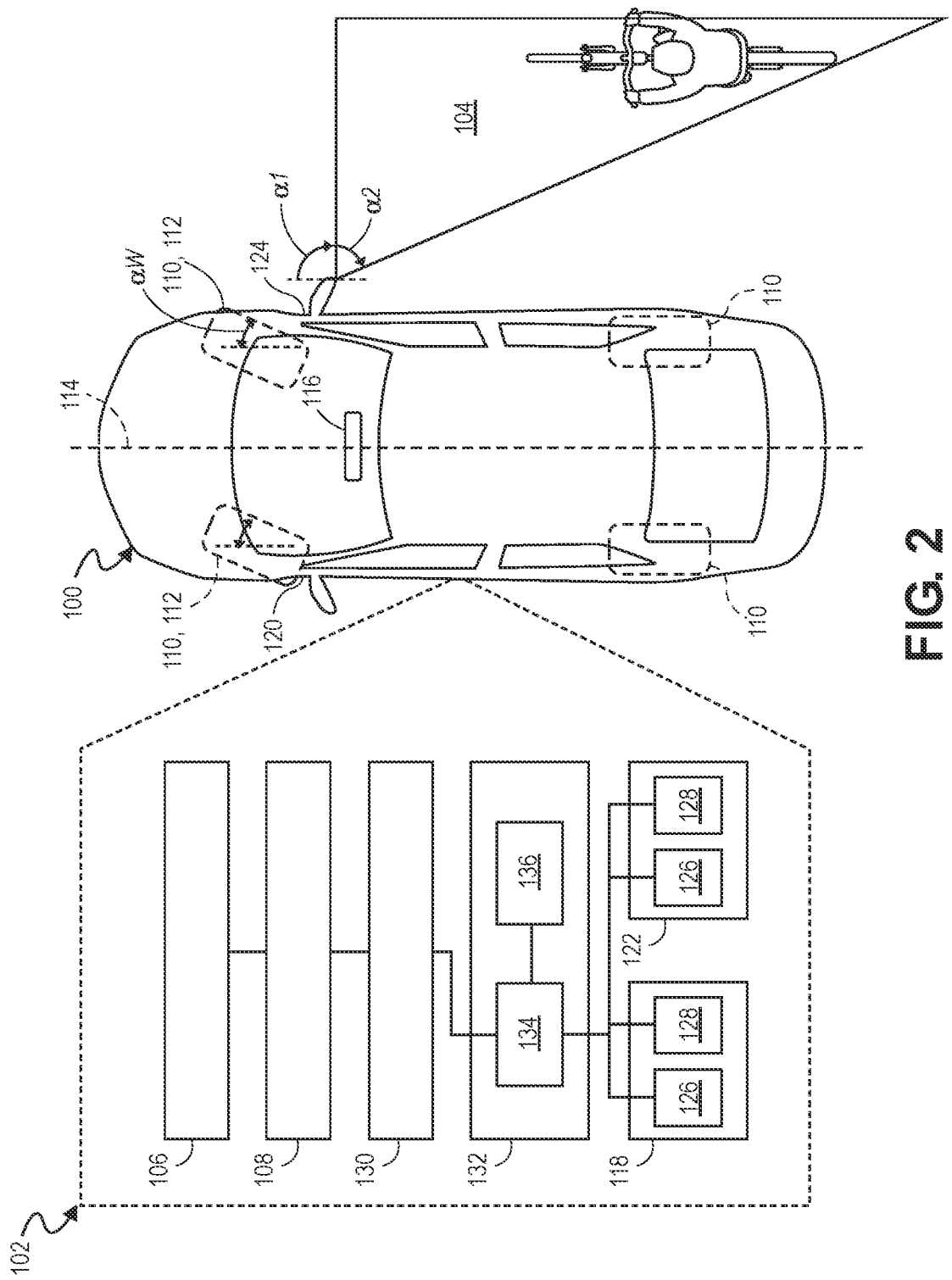
FIG. 2 is a schematic view of the motor vehicle of FIG. 1, illustrating the vehicle making a right turn and the system projecting a light onto a portion of roadway that is located to the right of the vehicle, with the light indicating a current size and a current location of a blind spot region being associated with a wheel angle for the right turn.

Referring to FIGS. 1 and 2, there is generally illustrated one example of a motor vehicle 100 having a blind spot warning system 102 for indicating a current size and a current location of a blind spot region 104 that are based on a wheel angle $\alpha W$. More specifically, the motor vehicle 100 further includes a steering wheel 106 operated by a driver and a steering shaft 108, which is connected to the steering wheel 106 and rotates in response to the driver operating the steering wheel 106. The motor vehicle 100 further has a plurality of wheels 110, including a pair of front wheels 112 that are coupled to the steering shaft 108 via multiple steering mechanisms (not shown). The front wheels 112 can be angularly deflected relative to a longitudinal axis 114 of the motor vehicle 100 by the wheel angle $\alpha W$, in response to the steering wheel 106 being rotated. The motor vehicle 100 further includes a rear view mirror 116, a left sideview mirror 118 attached to a left side 120 of the motor vehicle 100, e.g., a driver-side A-pillar or a front driver-side door, and a right sideview mirror 122 attached to a right side 124 of the motor vehicle 100, e.g., a passenger-side A pillar or passenger-side front door. The blind spot region 104 generally is a portion of the roadway that is not visible to the driver via a direct line of sight or in the rear mirror and the left and right sideview mirrors 118, 122. In addition, because the driver directs a line of sight toward the direction in which the vehicle 100 is turning, the blind spot region 104 is dynamic and changes its size and location when the driver operates the steering wheel 106 to turn the motor vehicle 100. While the non-limiting examples of the system 102 described below determine the blind spot region 104 based on the wheel angle αW, it is contemplated that other non-limiting examples of the system can determine the blind spot region based on any suitable parameter, such as the wheel angle of front and/or or rear wheels, the positions of the associated sideview mirrors and the rear view mirror on the vehicle, and/or the tilt of the associated sideview mirrors and the rear view mirror. It is also contemplated that other examples of the system can warn pedestrians of a static or constant blind spot region having a constant size and location based on any suitable parameter. As described in detail below, the system 102 further includes one or more notification devices, e.g. one or more light projectors 126 and one or more acoustic devices 128, for alerting pedestrians or bicyclists of the current size and the current location of the dynamic blind spot region 104 as the motor vehicle makes a turn. It is contemplated that other examples of the system can include any suitable notification device that alerts pedestrians and bicyclists of the dynamic blind spot region at any time, such as a predetermined amount of time before the vehicle makes a turn so as to provide advance notice of an upcoming turn.

The system 102 includes a steering angle sensor 130 (SAS), which is coupled to the steering shaft 108 and generates a steering signal associated with the wheel angle αW, in response to the steering shaft 108 rotating. In one non-limiting example, the SAS 130 generates the steering signal, in response to the driver operating the steering wheel 106 that in turn rotates the steering shaft 108. In other non-limiting examples, the SAS 130 generates the steering signal, in response to an autonomous driving system (not shown) rotating the steering shaft 108.

The system 102 further includes a computer 132 including one or more processors 134 and a non-transitory computer readable storage medium 136 (CRM) storing instructions. The processor 134 is programmed to determine the blind spot region 104 extending from the sideview mirror 118, 122 on the side of the motor vehicle 100 toward which the motor vehicle 100 is steered, in response to the processor 134 receiving the steering signal from the SAS 130. The blind spot region 104 is spaced from a line of sight of the driver and has a current size and a current location that are based on the wheel angle αW. The blind spot region 104 has a forward boundary 138 that is angularly spaced from the longitudinal axis 114 by a first angle α1 and a rear boundary 140 that is angularly spaced from the forward boundary by a second angle α2. In other non-limiting examples, it is contemplated that the processor can generate the actuation signal, in response to the driver activating a turn signal indicator and/or an autonomous driving system determining that the vehicle will turn within a threshold distance.

In this non-limiting example of the system, the blind spot region 104 is based on the wheel angle αW to account for the driver's attention to the direction in which the vehicle is turning. In particular, the processor 134 is further programmed to determine that the first angle α1 is 90 degrees and the second angle α2 is 60 degrees, in response to the processor 134 determining that the wheel angle αW is 3 degrees. The processor 134 is further programmed to determine that the first angle α1 is 80 degrees and the second angle α2 is 75 degrees, in response to the processor 134 determining that the wheel angle αW is 4.5 degrees. The processor 134 is further programmed to determine that the first angle α1 is 70 degrees and the second angle α2 is 85 degrees, in response to the processor 134 determining that the wheel angle αW is 9 degrees. The processor 134 is further programmed to determine that the first angle α1 is 70 degrees and the second angle α2 is 85 degrees, in response to the processor 134 determining that the wheel angle αW is 13.5 degrees. The processor 134 is further programmed to determine that the first angle α1 is 80 degrees and the second angle is 75 degrees, in response to the processor 134 determining that the wheel angle αW is 18 degrees. The processor 134 is further programmed to determine that the first angle α1 is 90 degrees and the second angle is 60 degrees, in response to the processor 134 determining that the wheel angle αW is 22.5 degrees. It is contemplated that the processor can determine, via a reference lookup table or an algorithm, that the dimensions of the blind spot region can be defined by other angles based on any suitable parameter, such as the wheel angle, the wheelbase, the location of the mirrors, and/or the tilt of the mirrors.

The processor 134 is further programmed to generate an actuation signal associated with the blind spot region 104. The system 102 further includes one or more light projectors 126, which are coupled to the processor 134. The light projectors 126 can be lasers, LEDs, or other suitable illumination devices that project light with a beam angle or beam spread onto a portion of the roadway to indicate a current size and a current location of the blind spot region 104, in response to the light projector 126 receiving the actuation signal from the processor 134. In this non-limiting example, the light projector 126 projects light on the entire blind spot region 104. More specifically, the light projector 126 projects light onto the roadway, such that the light has a leading edge 142 that is angularly spaced from the longitudinal axis 114 by the first angle α1 and overlaps the forward boundary 138 of the blind spot region 104, in response the light projector 126 receiving the actuation signal from the processor 134. The light projector 126 projects light onto the roadway, such that the light has a trailing edge 144 that is angularly spaced from the leading edge 142 by the second angle α2 and overlaps the rear boundary 140 of the blind spot region 104, in response the light projector 126 receiving the actuation signal from the processor 134. Also, in this non-limiting example, the light projector 126 projects light on only the portion of the roadway toward which the vehicle is turning. More specifically, the light projector 126 is configured to project light onto a portion of the roadway that is adjacent to the left side 120 of the vehicle 100 when the wheel angle αW steers the vehicle to the left (FIG. 1) and a portion the roadway that is adjacent to the right side 124 of the vehicle 100 when the wheel angle αW steers the vehicle 100 to the right (FIG. 2). It is contemplated that other examples of the system can include light projectors that illuminate a portion of the blind spot region and/or simultaneously illuminates blind spot regions on both sides of the vehicle. It is further contemplated that other non-limiting examples of the processor can be programmed to sequentially activate a plurality of the light projectors to generate an animated lighted image that travels between the leading edge 142 and the trailing edge 144 on the roadway and/or adjust an intensity of the light projectors and speed at which the animated image changes based on the wheel angle αW.

In this non-limiting example, the system 102 further includes an acoustic device 128, which is coupled to the processor 134. The acoustic device is configured to generate a sound and/or a message to warn nearby pedestrians and bicyclists that the motor vehicle is turning, in response to the acoustic device 128 receiving the actuation signal from the processor 134. One non-limiting examples of the acoustic device sound can include a loudspeaker that emits a constant tone, an intermittent tone, a chime, and/or a warning message or announcement, such as "turning left" or "turning right."

Figure 3:
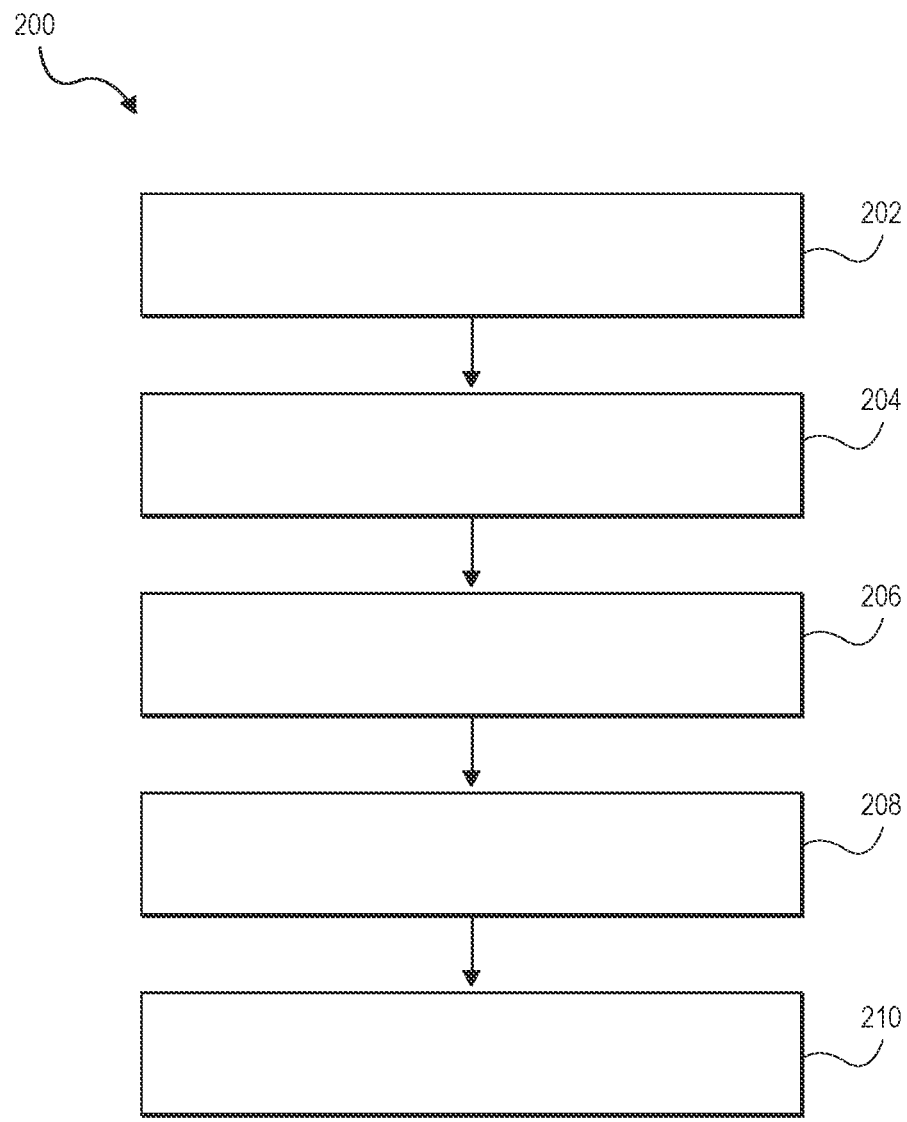
FIG. 3 is a flow chart of one example of a process for operating the system of FIG. 1.

Referring to FIG. 3, a process 200 is provided for operating the system 102 of FIGS. 1 and 2. The process 200 begins at block 202 with the steering wheel 106 being operated by a driver to rotate the steering shaft 108 and turn the vehicle 100. However, it is contemplated that an autonomous driving system (not shown) can rotate the steering shaft 108 to turn the vehicle 100.

At block 204, the SAS 130 generates a steering signal, in response to the steering shaft 108 being rotated. Continuing with the previous example, the SAS 130 can generate the steering signal, in response to the driver operating the steering wheel or an autonomous driving system rotating the steering shaft. The steering signal is associated with the wheel angle αW and the direction in which the driver is steering the vehicle.

At block 206, the processor 134 determines the blind spot region 104 that extends from the sideview mirror on the side toward the direction that the driver is steering the vehicle, in response to the processor 134 receiving the steering signal from the SAS 130. The blind spot region 104 is spaced from the line of sight of the driver and has a current size and a current location that are based on the wheel angle αW. In one non-limiting example, the size and the location of the blind spot region 104 can be determined from a reference lookup table that is based on wheel angle αW and stored in the CRM 136. The blind spot region 104 includes the forward boundary 138 angularly spaced from the longitudinal axis 114 by the first angle α1 and a rear boundary 140 angularly spaced from the forward boundary 138 by a second angle α2.

At block 208, the processor 134 generates the actuation signal, which is associated with the blind spot region 104 and based on the wheel angle αW. In other examples, the processor 134 can generate the actuation signal, in response to the driver activating a turn signal indicator.

At block 210, the light projector 126 emits or projects the light onto the roadway adjacent to the motor vehicle 100, in response to the light projector 126 receiving the actuation signal from the processor 134. In this non-limiting example, the light covers the entire blind spot region 104 to indicate the location and the size of the blind spot region 104 on the side of the motor vehicle toward which the vehicle is turning. More specifically, the light projector 126 projects the light such that the forward boundary 138 is angularly spaced from the longitudinal axis 114 by the first angle α1 and overlaps the forward boundary 138 of the blind spot region 104, in response the light projector 126 receiving the actuation signal from the processor 134. In addition, the light projector 126 projects the light such that the trailing edge 144 is angularly spaced from the leading edge 142 by the second angle α2 and overlaps the rear boundary 140 of the blind spot region 104, in response the light projector 126 receiving the actuation signal from the processor 134. It is contemplated that other examples of the system can include light projectors that illuminate a portion of the blind spot region and/or simultaneously illuminates blind spot regions on both sides of the vehicle. It is further contemplated that other non-limiting examples of the processor can be programmed to sequentially activate a plurality of the light projectors to generate an animated lighted image that travels between the leading edge 142 and the trailing edge 144 on the roadway and/or adjust an intensity of the light projectors and speed at which the animated image changes based on the wheel angle αW.

In general, the computing systems and/or devices described may employ any of a number of computer operating systems, including, but by no means limited to, versions and/or varieties of the ANDROID AUTOMOTIVE OS developed by GOOGLE INC., the MICROSOFT WINDOWS operating system, the UNIX operating system (e.g., the SOLARIS operating system distributed by ORACLE Corporation of Redwood Shores, California), the AIX UNIX operating system distributed by INTERNATIONAL BUSINESS MACHINES of Armonk, New York, the LINUX operating system, the MAC OSX and iOS operating systems distributed by APPLE INC. of Cupertino, California, the BLACKBERRY OS distributed by BLACKBERRY LTD. of Waterloo, Canada, and the OPEN HANDSET ALLIANCE, or the QNX CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM that participates in providing data (e.g., instructions) may be read by the computer (e.g., by a processor of a computer and may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A blind spot warning system of a motor vehicle, with the motor vehicle having a longitudinal axis and a steering shaft that turns the motor vehicle relative to the longitudinal axis, the blind spot warning system comprising:
   a steering angle sensor coupled to the steering shaft for generating a steering signal associated with a wheel angle in response to the steering shaft rotating;
   a computer including at least one processor and a non-transitory computer readable storage medium storing instructions, such that the at least one processor is programmed to:
      determine a blind spot region extending from a sideview mirror of the motor vehicle in response to the at least one processor receiving the steering signal from the steering angle sensor, with the blind spot region being spaced from a line of sight of a driver and having a current size and a current location that are based on the wheel angle, and the blind spot region having a forward boundary that is angularly spaced from the longitudinal axis by a first angle and a rear boundary that is angularly spaced from the forward boundary by a second angle; and
      generate an actuation signal associated with the blind spot region; and
   at least one light projector coupled to the at least one processor and projecting a visible light onto a roadway adjacent to the motor vehicle in response to the light projector receiving the actuation signal from the at least one processor, with the visible light indicating the current size and the current location of the blind spot region relative to the motor vehicle.

2. The blind spot warning system of claim 1 wherein the at least one light projector is configured to project the visible light onto a portion of the roadway such that the visible light has a leading edge that is disposed at the first angle relative to the longitudinal axis and overlaps the forward boundary of the blind spot region in response the light projector receiving the actuation signal from the at least one processor.

3. The blind spot warning system of claim 2 wherein the at least one light projector is configured to project the visible light onto the portion of the roadway such that the visible light has a trailing edge that is disposed at the second angle relative to the leading edge of the visible light and overlaps the rear boundary of the blind spot region in response the light projector receiving the actuation signal from the at least one processor.

4. The blind spot warning system of claim 3 further comprising an acoustic device coupled to the at least one processor and configured to generate at least one of a sound and a message in response to the acoustic device receiving the actuation signal from the at least one processor.

5. A blind spot warning system of a motor vehicle, with the motor vehicle having a longitudinal axis and a steering shaft that turns the motor vehicle relative to the longitudinal axis, the blind spot warning system comprising:
   a steering angle sensor coupled to the steering shaft for generating a steering signal associated with a wheel angle in response to the steering shaft rotating;
   a computer including at least one processor and a non-transitory computer readable storage medium storing instructions, such that the at least one processor is programmed to:
      determine a blind spot region extending from a sideview mirror of the motor vehicle in response to the at least one processor receiving the steering signal from the steering angle sensor, with the blind spot region being spaced from a line of sight of a driver and having a current size and a current location that are based on the wheel angle, and the blind spot region having a forward boundary that is angularly spaced from the longitudinal axis by a first angle and a rear boundary that is angularly spaced from the forward boundary by a second angle;

generate an actuation signal associated with the blind spot region; and determine that the first angle is 90 degrees and the second angle is 60 degrees in response to the at least one processor determining that the wheel angle is 3 degrees; and a light projector coupled to the at least one processor and projecting a visible light onto a roadway adjacent to the motor vehicle in response to the light projector receiving the actuation signal from the at least one processor, with the visible light indicating the current size and the current location of the blind spot region relative to the motor vehicle.

6. The blind spot warning system of claim 5 wherein the at least one processor is further programmed to determine that the first angle is 80 degrees and the second angle is 75 degrees in response to the at least one processor determining that the wheel angle is 4.5 degrees.

7. The blind spot warning system of claim 6 wherein the at least one processor is further programmed to determine that the first angle is 70 degrees and the second angle is 85 degrees in response to the at least one processor determining that the wheel angle is 9 degrees.

8. The blind spot warning system of claim 7 wherein the at least one processor is further programmed to determine that the first angle is 70 degrees and the second angle is 85 degrees in response to the at least one processor determining that the wheel angle is 13.5 degrees.

9. The blind spot warning system of claim 8 wherein the at least one processor is further programmed to determine that the first angle is 80 degrees and the second angle is 75 degrees in response to the at least one processor determining that the wheel angle is 18 degrees.

10. The blind spot warning system of claim 9 wherein the at least one processor is further programmed to determine that the first angle is 90 degrees and the second angle is 60 degrees in response to the at least one processor determining that the wheel angle is 22.5 degrees.

11. A method comprising:

providing a blind spot warning system of a motor vehicle, with the motor vehicle having a longitudinal axis, a sideview mirror, a steering wheel attached to a steering shaft that turns the motor vehicle relative to the longitudinal axis, a steering angle sensor coupled to the steering shaft for generating a steering signal associated with a wheel angle in response to the steering shaft rotating, a light projector, wherein the light projector is one of a laser and a light emitting diode, and a computer including at least one processor and a non-transitory computer readable storage medium storing instructions;

rotating, using the steering wheel, the steering shaft;

generating, using the steering angle sensor, a steering signal in response to the steering shaft being rotated;

determining, using the at least one processor, a blind spot region extending from the sideview mirror of the motor vehicle in response to the at least one processor receiving the steering signal from the steering angle sensor, with the blind spot region being spaced from a line of sight of a driver and having a current size and a current location that are based on the wheel angle, and the blind spot region having a forward boundary that is angularly spaced from the longitudinal axis by a first angle and a rear boundary that is angularly spaced from the forward boundary by a second angle;

generating, using the at least one processor, an actuation signal associated with the blind spot region; and projecting, using the light projector, a light onto a roadway adjacent to the motor vehicle in response to the light projector receiving the actuation signal from the at least one processor, with the light indicating the current size and the current location of the blind spot region relative to the motor vehicle.

12. The method of claim 11, further comprising determining that the first angle is 90 degrees and the second angle is 60 degrees in response to the at least one processor determining that the wheel angle is 3 degrees.

13. The method of claim 12, further comprising determining that the first angle is 80 degrees and the second angle is 75 degrees in response to the at least one processor determining that the wheel angle is 4.5 degrees.

14. The method of claim 13, further comprising determining that the first angle is 70 degrees and the second angle is 85 degrees in response to the at least one processor determining that the wheel angle is 9 degrees.

15. The method of claim 14, further comprising determining that the first angle is 70 degrees and the second angle is 85 degrees in response to the at least one processor determining that the wheel angle is 13.5 degrees.

16. The method of claim 15, further comprising determining that the first angle is 80 degrees and the second angle is 75 degrees in response to the at least one processor determining that the wheel angle is 18 degrees.

17. The method of claim 16, further comprising determining that the first angle is 90 degrees and the second angle is 60 degrees in response to the at least one processor determining that the wheel angle is 22.5 degrees.

18. The method of claim 11, further comprising projecting, using the light projector, the light onto a portion of the roadway such that the light has a leading edge that is disposed at the first angle relative to the longitudinal axis and overlaps the forward boundary of the blind spot region, in response the light projector receiving the actuation signal from the at least one processor.

19. The method of claim 18, further comprising projecting, using the light projector, the light onto the portion of the roadway such that the light has a trailing edge that is disposed at the second angle relative to the leading edge of the light and overlaps the rear boundary of the blind spot region in response the light projector receiving the actuation signal from the at least one processor.

\* \* \* \* \*